US008164280B2

United States Patent
Park et al.

(10) Patent No.: US 8,164,280 B2
(45) Date of Patent: Apr. 24, 2012

(54) ELECTRONIC BALLAST

(75) Inventors: Hyun Joo Park, Yangju-si (KR); Woo Sung Choi, Goyang-si (KR)

(73) Assignee: FEELUX Co., Ltd., Kyonggi-do (KR)

( * ) Notice: Subject to any disclaimer, the term of this patent is extended or adjusted under 35 U.S.C. 154(b) by 310 days.

(21) Appl. No.: 12/588,639

(22) Filed: Oct. 22, 2009

(65) Prior Publication Data

US 2010/0102742 A1 Apr. 29, 2010

(30) Foreign Application Priority Data

Oct. 24, 2008 (KR) .................. 10-2008-0104724

(51) Int. Cl.
*H05B 37/02* (2006.01)
(52) U.S. Cl. ............... 315/311; 315/209 R; 315/224; 315/247; 315/291; 315/308
(58) Field of Classification Search ............ 315/209 R, 315/224, 225, 246, 247, 291, 297, 307, 308, 315/311
See application file for complete search history.

(56) References Cited

U.S. PATENT DOCUMENTS

| 5,103,140 | A | * | 4/1992 | Cocoma et al. | 315/248 |
|---|---|---|---|---|---|
| 5,289,083 | A | * | 2/1994 | Quazi | 315/224 |
| 5,389,857 | A | * | 2/1995 | Abbott et al. | 315/94 |
| 5,416,387 | A | * | 5/1995 | Cuk et al. | 315/307 |
| 5,900,701 | A | * | 5/1999 | Guhilot et al. | 315/307 |
| 5,902,506 | A | * | 5/1999 | Scott et al. | 219/608 |
| 5,962,988 | A | * | 10/1999 | Nuckolls et al. | 315/291 |
| 5,969,484 | A | * | 10/1999 | Santi et al. | 315/247 |
| 6,040,661 | A | * | 3/2000 | Bogdan | 315/224 |
| 6,486,616 | B1 | * | 11/2002 | Liu et al. | 315/291 |
| 7,119,494 | B2 | * | 10/2006 | Hui et al. | 315/219 |

* cited by examiner

*Primary Examiner* — Douglas W Owens
*Assistant Examiner* — Thai Pham
(74) *Attorney, Agent, or Firm* — The PL Law Group, PLLC

(57) ABSTRACT

Provided is an electronic ballast including: a rectifier which rectifies alternating current (AC) power into direct current (DC) power; a power factor compensator which improves a power face of the DC power; an inverter which inverts the DC current into high frequency square wave power; and a resonant circuit which receives the high frequency square wave power from the inverter, adjusts impedance, transforms the high frequency square wave power into high frequency sine wave power, and outputs the high frequency sine wave power.

7 Claims, 5 Drawing Sheets

ELECTRONIC BALLAST

CROSS-REFERENCE TO RELATED PATENT APPLICATION

This application claims the benefit of Korean Patent Application No. 10-2008-0104724, filed on Oct. 24, 2008, in the Korean Intellectual Property Office, the disclosure of which is incorporated herein in its entirety by reference.

BACKGROUND OF THE INVENTION

1. Field of the Invention

The present invention relates to an electronic ballast, and more particularly, to an electronic ballast for varying an inductor or a capacitor of a resonance circuit according to a selection of a user in order to adjust consumed power of a lamp.

2. Description of the Related Art

A fluorescent lamp is a kind of discharge tubes and requires a high voltage on an initial stage to discharge thermal electrons necessary for electric discharge. Also, the fluorescent lamp has a negative resistance characteristic in which a voltage applied thereto after the electric discharge decreases with an increase in a current flowing in the fluorescent lamp. Therefore, the fluorescent lamp is unstably lighted or broken down due to the negative resistance characteristic. An electronic ballast supplies a high voltage to the fluorescent lamp on the initial stage to light the fluorescent lamp and then controls the current flowing in the fluorescent lamp to keep the brightness of the fluorescent lamp constant.

Since a magnetic ballast uses a chock coil, a leakage transformer, and a high capacity condenser, the magnetic ballast loses a large amount of power of about 8 W due to light emitted from a fluorescent lamp and heat generated by an iron core and a copper wire. Thus, power of about 8 W or more is lost. Also, since the magnetic ballast lights the fluorescent lamp with commonly used power of 60 Hz, the fluorescent lamp flickers. When a power state is poor and the magnetic ballast is worn out, the fluorescent lamp may more seriously flicker and may not be lighted up at a low ambient temperature or a high percentage of humidity.

In order to solve these problems, the electronic ballast rectifies commonly used alternating current (AC) power of 60 Hz into direct current (DC) power using a semiconductor device. Also, an inverter circuit converts the DC power into high frequency power between 25 KHz and 50 KHz so as to stably light the fluorescent lamp through an output power controlling circuit. Since the electronic ballast lights the fluorescent lamp using the high frequency power, the electronic ballast improves luminous efficiency by about 15%, compared to the magnetic ballast. Also, since the electronic ballast uses the semiconductor device, the electronic ballast reduces loss of power caused by heat generated from the chock coil by about 25%. Thus, the electronic ballast a power saving effect of 35% or more, compared to the magnetic ballast.

Besides saving power, the electronic ballast lights the fluorescent lamp (which flickers 5 to 10 million times per second) using the high frequency power to supply high-quality light sensed by eyes so as to protect eyesight. In addition, the electronic ballast removes noise which is generated by vibrations of an electromagnetic force generated by the chock coil and the iron core of the magnetic ballast. The electronic ballast is lighter than the magnetic ballast and generates heat 10° lower than the magnetic ballast. Thus, the electronic ballast reduces a heating rate. Since the electronic ballast lights the fluorescent lamp even at a low voltage, the electronic ballast is appropriate in the summer in which a power state is poor or in a region in which a power state is poor. Also, the electronic ballast lights the fluorescent lamp at a low temperature and uses lamps without distinction.

The above contents have been described to help understanding of the present invention but do not mean the prior art widely well known in the art to which the present invention pertains.

SUMMARY OF THE INVENTION

As described above, an electronic ballast may minimize a reduction in energy efficiency caused by loss of heat and loss of power caused by a decrease in a power factor, compared to a magnetic ballast. Thus, the electronic ballast may efficiently save power. However, the electronic ballast generates constant power and thus cannot control power varying according to a selection of a user. Thus, the electronic ballast may not save power of a product in which the electronic ballast is installed. As a result, these disadvantages of the electronic ballast are required to be solved.

Accordingly, in order to solve the above problems, the present invention provides an electronic ballast for varying an inductor or a capacitor of a resonant circuit according to a selection of a user to adjust consumed power of a lamp so as to more efficiently control a power saving effect.

According to an aspect of the present invention, there is provided an electronic ballast including: a rectifier which rectifies alternating current (AC) power into direct current (DC) power; a power factor compensator which improves a power face of the DC power; an inverter which inverts the DC current into high frequency square wave power; and a resonant circuit which receives the high frequency square wave power from the inverter, adjusts impedance, transforms the high frequency square wave power into high frequency sine wave power, and outputs the high frequency sine wave power.

The resonant circuit may include an inductance adjuster and a capacitor. The inductance adjuster may include a variable inductor and a switch which selects an inductance value of the variable inductor.

The inductance adjuster may include a first resonant inductor, a second resonant inductor, and a switch which selects the first or second resonant inductor. The inductance adjuster may include an inductor and a capacitance adjuster. The capacitance adjuster may include a second resonant capacitor, a third resonant capacitor, and a switch which selects the second or third resonant capacitor. The switch may be connected to and controlled by a switch control which is positioned outside a fluorescent lamp case.

According to another aspect of the present invention, there is provided an electronic ballast including: a rectifier which rectifies AC power into DC power; a power factor compensator which improves a power face of the DC power; an inverter which inverts the DC current into high frequency square wave power; and a resonant circuit which receives the high frequency square wave power from the inverter, adjusts impedance, transforms the high frequency square wave power into high frequency sine wave power, and outputs the high frequency sine wave power.

The resonant circuit may include an inductance adjuster and a capacitor.

When the inverter includes first and second nodes as output nodes, the resonant circuit may include: a first resonant capacitor which includes an end connected to the first node and an other end connected to the inductance adjuster; and a second resonant capacitor which includes an end connected to the second node and an other end connected to the inductance adjuster, and the inductance adjuster may include: a variable inductor which includes an end connected to the another end of the first resonant capacitor; and a switch which comprises an end selectively connected to one of a node and an other end of the variable inductor and an other end connected to the other end of the second resonant capacitor.

When the inverter includes first and second nodes as output nodes, the resonant circuit may include: a first resonant capacitor which includes an end connected to the first node and an other end connected to the inductance adjuster; and a second resonant capacitor which includes an end connected to the second node and an other end connected to the inductance adjuster, and the inductance adjuster may include: a first resonant inductor which includes an end connected to the other end of the first resonant capacitor; a second resonant inductor which includes an end connected to an other end of the first resonant capacitor; and a switch which includes an end selectively connected to one of the other end of the first resonant inductor and an other end of the second resonant inductor and an other end connected to the other end of the second resonant capacitor.

When the inverter includes first and second nodes as output nodes, the resonant circuit may include: a first resonant capacitor which includes an end connected to the first node and an other end connected to the inductance adjuster; and a second resonant capacitor which includes an end connected to the second node and an other end connected to the inductance adjuster, and the inductance adjuster may include: first through $n^{th}$ resonant inductors which include ends respectively connected to the other end of the first resonant capacitor in parallel; and a switch which includes ends selectively connected to other ends of the first through $n_{th}$ resonant inductors and an other end connected to the other end of the second resonant capacitor.

When the inverter includes first and second nodes as output nodes, the resonant circuit may include a first resonant capacitor and an inductor which are sequentially connected to the first node and a capacitance adjuster which is connected between the inductor and the second node.

The capacitance adjuster may include: a second resonant capacitor which includes an end connected to the second node; a third resonant capacitor which includes an end connected to the second node; and a switch which includes an end selectively connected to one of an other end of the second resonant capacitor and an other end of the third resonant capacitor and an other end connected to the inductor.

The capacitance adjuster may include: second through $n^{th}$ resonant capacitors which include ends respectively connected to the second node in parallel; and a switch which includes ends selectively connected to other ends of the second through $n^{th}$ resonant capacitors and an other end connected to the inductor. The switch may be connected to and controlled by a switch control which is positioned outside a fluorescent lamp case.

As described above, an electronic ballast according to the present invention can vary an inductor or a capacitor of a resonant circuit according to a selection of a user to adjust consumed power of a lamp according to the selection of the user so as to save energy. Also, the user can further easily and conveniently control the consumed power through a switch control which is positioned outside a fluorescent lamp case.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
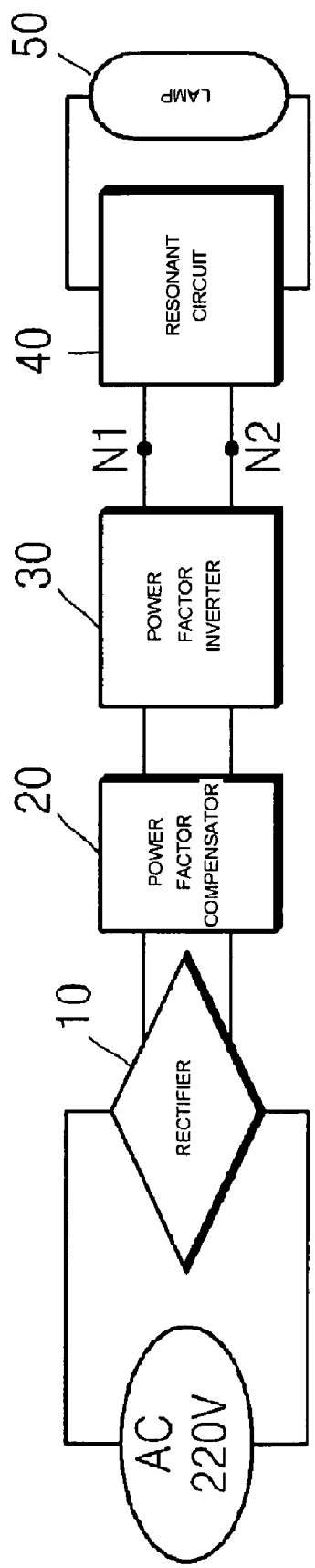
FIG. 1 is a schematic block diagram of an electronic ballast according to an embodiment of the present invention.

The present invention will now be described more fully with reference to the accompanying drawings, in which exemplary embodiments of the invention are shown. In the drawings, the thicknesses of lines or the sizes of elements are exaggerated for clarity. Also, since later-described terms are defined in consideration of the functions of the present invention, they may vary according to users' intentions or practice. Hence, the terms must be interpreted based on the contents of the entire specification.

FIG. 1 is a schematic block diagram of an electronic ballast according to an embodiment of the present invention. Referring to FIG. 1, the electronic ballast includes a rectifier 10, a power factor compensator 20, an inverter 30, a resonant circuit 40, and a lamp 50.

An operation of the electronic ballast of the present embodiment will now be described in detail.

The rectifier 10 receives alternating current (AC) power from an external source and rectifies the AC power into direct current (DC) power. The power factor compensator 20 improves a power factor of the DC power. For example, the power factor compensator 20 improves the power factor of the DC power supplied from the rectifier 10 to about 99% using a semiconductor smoothing circuit used for compensating a power factor and considerably reduces a harmonic component of a current which is to be supplied to a system, in order to reduce noise caused by the rectification into the DC power.

The inverter 30 receives the DC power from the rectifier 10 and the power factor compensator 20, generates high frequency square wave power, and outputs the high frequency square wave power to the resonant circuit 40. The resonant circuit 40 receives the high frequency square wave power from the inverter 30, adjusts impedance using an inductor and a capacitor to adjust a resonant frequency, transforms the high frequency square wave power into high frequency sine wave power, and outputs the high frequency sine wave power. Here, power consumed by the lamp 50 is adjusted with the adjustment of the impedance. The lamp 50 emits light and varies illuminance according to the high frequency sine wave power supplied from the resonant circuit 40.

Figure 2:
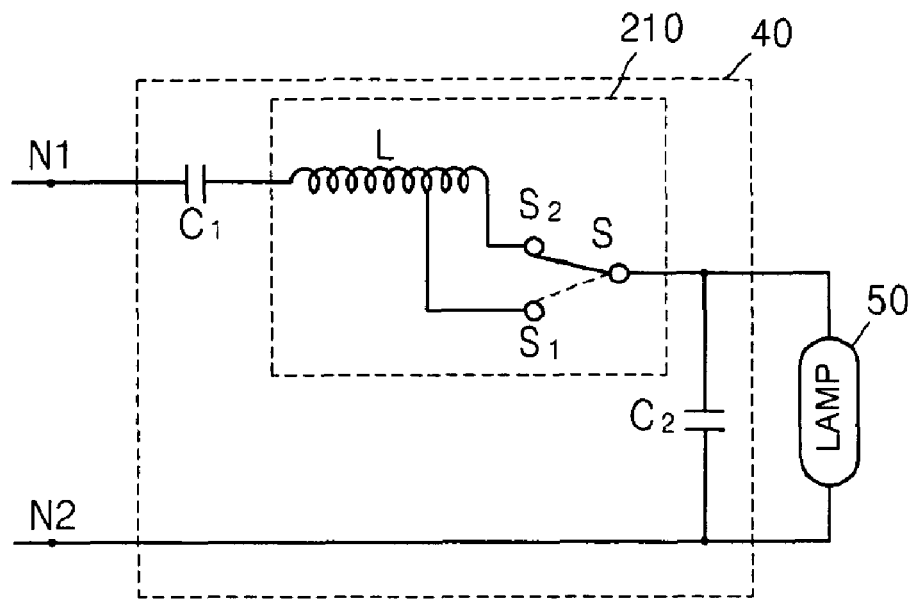
FIGS. 2 through 4 are circuit diagrams of resonant circuits of the electronic ballast of FIG. 1, according to embodiments of the present invention.
Figure 3:
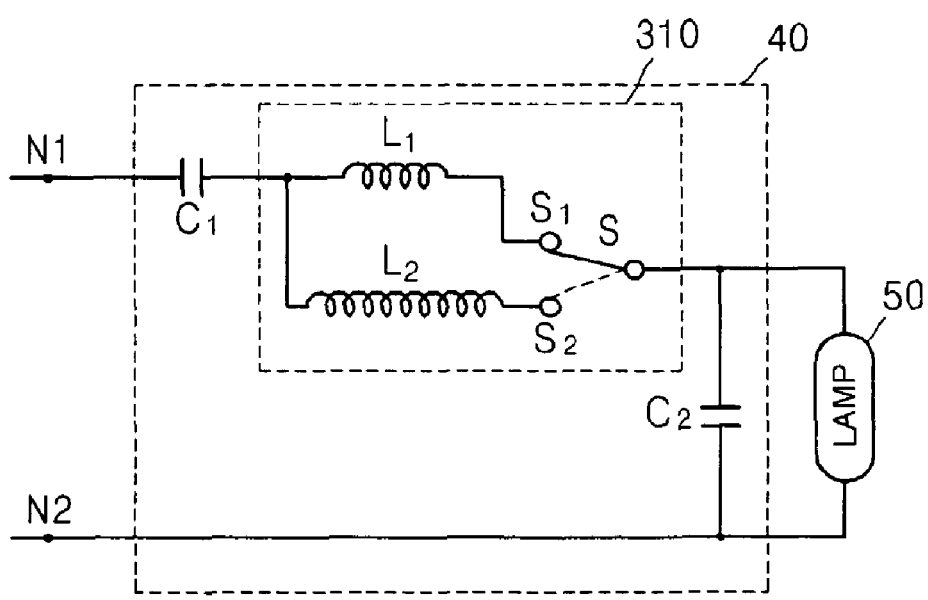
Figure 4:
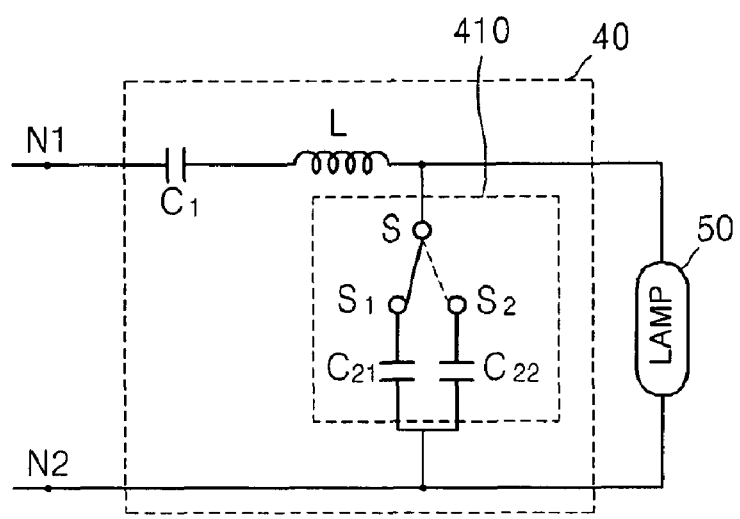

FIGS. 2 through 4 are circuit diagrams of the resonant circuit 40 of the electronic ballast of FIG. 1, according to embodiments of the present invention As shown in FIGS. 2 and 3, the resonant circuit 40 includes a first resonant capacitor "$C_1$," a second resonant capacitor "$C_2$," and an inductance adjuster 210 or 310.

When a frequency of the high frequency square wave power output from the inverter 30 approaches a resonant frequency of the resonant circuit 40, the high frequency sine wave power is applied to the lamp 50. In other words, the resonant frequency of the resonant circuit 40 is adjusted with the adjustment of the inductor and the capacitor of the resonant circuit 40 and the high frequency square wave power is converted into the high frequency sine wave power. Thus, the consumed power of the lamp 50 is adjusted according to adjusted values of the inductor and the capacitor.

The resonant frequency is determined by values of the first resonant capacitor "$C_1$," the second resonance capacitor "$C_2$," and a variable inductor "L," and an intensity of the variable inductor "L" may be adjusted by the inductance adjuster 210 according to an aspect of the present invention.

If the inverter 30 includes first and second nodes "N1" and "N2" as output nodes, an end of the first resonance capacitor "$C_1$" is connected to the first node "N1," and an other end of the first node "N1" is connected to the inductance adjuster 210. An end of the second resonant capacitor "$C_2$" is connected to the second node "N2," and an other end of the second resonant capacitor "$C_2$" is connected to the inductance adjuster 210.

The inductance adjuster 210 includes the variable inductor "L" and a switch.

An end "$S_1$" of the switch "S" is selectively connected to the variable inductor "L" of which other end is connected the other end of the first resonant capacitor "$C_1$," a node of the variable inductor "L," or an other end of the variable inductor "L," and an other end "$S_2$" of the switch "S" is connected to the other end of the second resonant capacitor "$C_2$."

A value of the variable inductor "L" is adjusted depending on a switching operation selected by a user. Also, the user adjusts the resonant frequency of the resonant circuit 40 according to the value of the variable inductor "L" to generate the high frequency sine wave power which is output to the lamp 50 and simultaneously controls the consumed power of the lamp 50.

Referring to FIG. 3, an end of a first resonant inductor "$L_1$" is connected to an end of a second resonant inductor "$L_2$" in parallel and is connected to the first resonant capacitor "$C_1$" in series, and other ends of the first and second resonant inductors "$L_1$" and "$L_2$" are connected to an end of the switch.

In other words, the end of the first resonant capacitor "$C_1$" is connected to the first node "N1," the other end of the first resonant capacitor "$C_1$" is connected to the inductance adjuster 310, the end of the second resonant capacitor "$C_2$" is connected to the second node "N2," and the other end of the second resonant capacitor "$C_2$" is connected to the inductance adjuster 310.

The inductance adjuster 310 includes the first resonant inductor "$L_1$" of which end is connected to the other end of the first resonant capacitor "$C_1$," the second resonant inductor "$L_2$," of which end is connected to the other end of the first resonant capacitor "$C_1$," and the switch "S" of which end "$S_1$" is selectively connected to an other end of the first resonant inductor "$L_1$" or an other end of the second resonant inductor "$L_2$," and of which other end "$S_2$" is connected to the other end of the second resonant capacitor "$C_2$."

A value of the first resonant inductor "$L_1$" or the second resonant inductor "$L_2$" is selected according to the switching operation selected by the user. Thus, the high frequency sine wave power output to the lamp 50 is controlled, and the consumed power of the lamp 50 is controlled.

The resonant circuit 40 includes one inductor "L" and one switch in FIG. 2 but two inductors and one switch in FIG. 3. However, it will be understood by those of ordinary skill in the art that the resonant circuit 40 may include a plurality of inductors and a plurality of switches.

This structure of the resonant circuit 40 will now be described with reference to FIG. 7.

Figure 7:
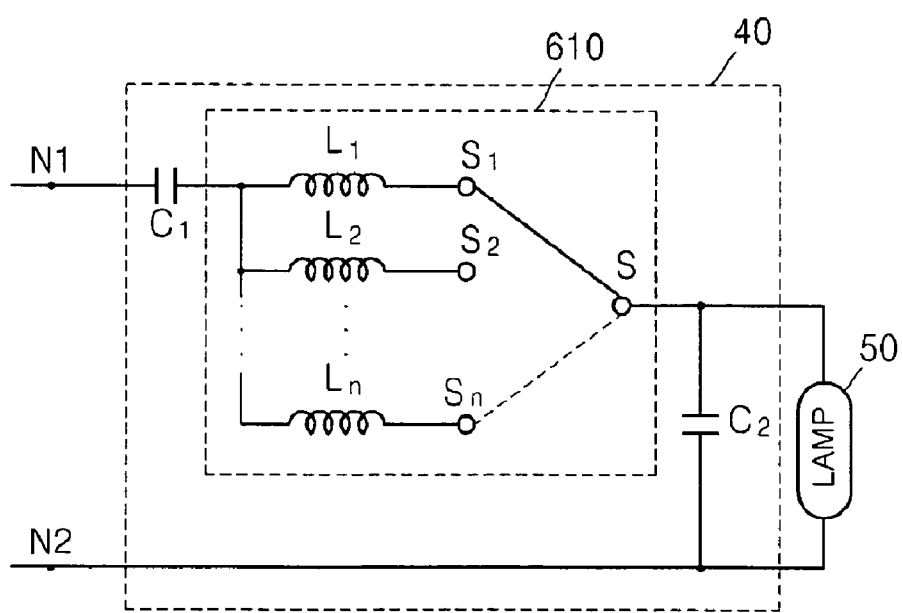
FIG. 7 is a circuit diagram of the resonant circuit of FIG. 3, according to another embodiment of the present invention.

Referring to FIG. 7, when the inverter 30 includes the first and second nodes "N1" and "N2" as output nodes, the resonant circuit 40 includes a first resonant capacitor "$C_1$" of which end is connected to the first node "N1" and of which other end is connected to an inductance adjuster 610 and a second resonant capacitor "$C_2$" of which end is connected to the second node "N2" and of which other end is connected to the inductance adjuster 610.

In particular, the inductance adjuster 610 includes first through $n^{th}$ inductors "$L_1$," "$L_2$" . . . , and "$L_n$" having ends connected to an other end of the first resonant capacitor "$C_1$" in parallel and a switch "S" of which ends "$S_1$," "$S_2$," . . . , and "$S_n$" are selectively connected to other ends of the first through $n^{th}$ inductors "$L_1$," "$L_2$" . . . , and "$L_n$" and of which other end is connected to an other end of the second resonant capacitor "$C_2$."

The switch selects one of the other ends of the first through $n^{th}$ inductors "$L_1$," "$L_2$" . . . , and "$L_n$" to vary an inductance value. Thus, the high frequency sine wave power output to the lamp 50 is controlled, and the consumed power of the lamp 50 is controlled.

Referring to FIG. 4, when the inverter 30 includes the first and second nodes "N1" and "N2" as output nodes, the resonant circuit 40 includes the first resonant capacitor "$C_1$" and the inductor "L" which are sequentially connected to the first node "N1" in series and a capacitance adjuster 410 which is connected between the inductor "L" and the second node "N2."

The capacitance adjuster 410 includes a second resonant capacitor "$C_{21}$" of which end is connected to the second node "N2, a third resonant capacitor "$C_{22}$" of which end is connected to the second node, and a switch of which end "$S_1$" is selectively connected to an other end of the second resonant capacitor "$C_{21}$" or an other end of the third resonant capacitor "$C_{22}$" and of which other end "$S_2$" is connected to the inductor "L." The capacitance adjuster 410 includes two capacitors and one switch in FIG. 4 but may include a plurality of capacitors and a plurality of switches.

A value of the second resonant capacitor "$C_{21}$" and the third resonant capacitance "$C_{22}$" is selected depending on the switching operation selected by the user. Thus, the high frequency since wave power output to the lamp 50 is controlled, and the consumed power of the lamp 50 is controlled.

Figure 8:
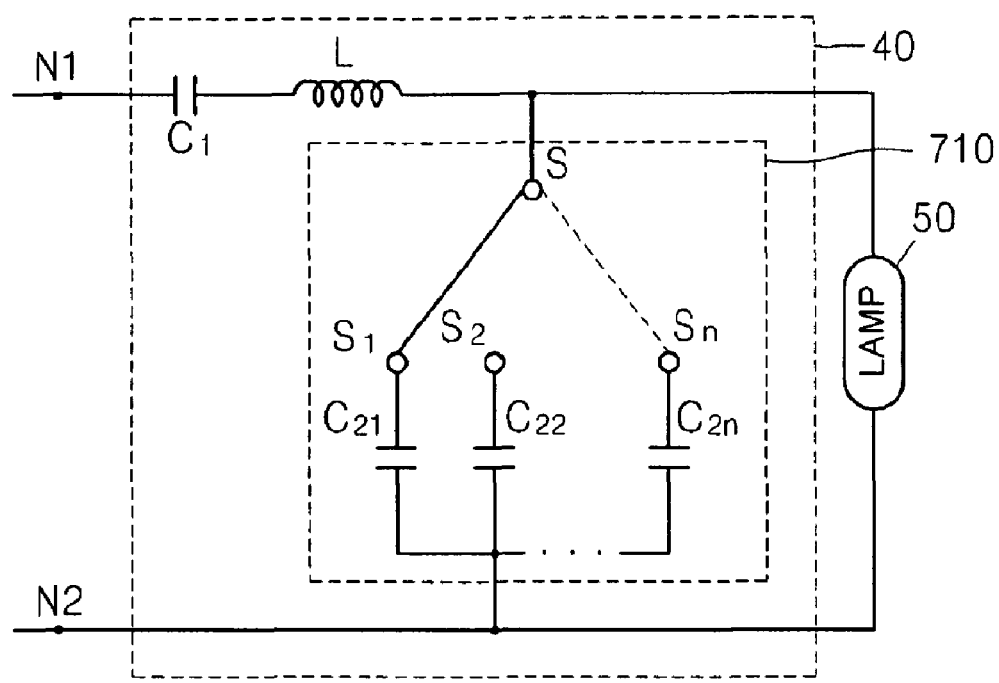
FIG. 8 is a circuit diagram of the resonant circuit of FIG. 4, according to another embodiment of the present invention.

The structure of a capacitance adjuster including a plurality of capacitors and a plurality of switches will now be described with reference to FIG. 8. Referring to FIG. 8, a capacitance adjuster 710 includes second through $n^{th}$ resonant capacitors "$C_{21}$," "$C_{22}$," . . . , and "$C_{2n}$" having ends connected to the second node "N2" in parall and a switch "S" of which ends "$S_1$," "$S_2$," . . . , and "$S_n$" are selectively connected to other ends of the second through $n^{th}$ resonant capacitors "$C_{21}$," "$C_{22}$," . . . , and "$C_{2n}$" and of which other end is connected to the inductor "L."

In the structure of the capacitance adjuster 710 of FIG. 8, one of the second through $n^{th}$ resonant capacitors "$C_{21}$," "$C_{22}$," . . . , and "$C_{2n}$" is selectively selected to select various capacitance values. Thus, the high frequency sine wave power output to the lamp 50 is controlled, and the consumed power of the lamp 50 is controlled.

Here, the switch is connected to a switch control 510 which is positioned outside a fluorescent lamp case 500 so as to be controlled by the switch control 510. In other words, the switch control 510 controls the switches shown in FIGS. 2 through 4 to adjust capacitance and inductance so as to control the resonant frequency and the consumed power of the lamp 50. For example, when the switch control 510 is in a position "ON1," the end "$S_1$" of the switch is selected. When the switch control 510 is in a position "ON2," the other end "$S_2$" of the switch is selected. Thus, the capacitance and the inductance are controlled.

Figure 9:
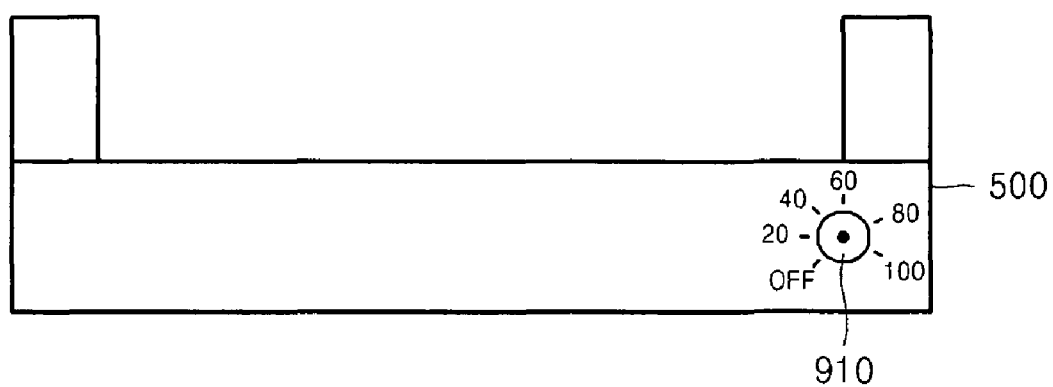
FIG. 9 is a front view of a fluorescent lamp case including a switch control according to another embodiment of the present invention.

A switch control 910 of FIG. 9 may be used in the structures of the inductance adjuster 610 of FIG. 7 and the capacitance adjuster 710 8. In other words, since the inductance adjuster 610 of FIG. 7 includes the plurality of resonant inductors "$L_1$," "$L_2$," . . . , and "$L_n$," and the capacitance adjuster 710 of FIG. 8 includes the plurality of resonant capacitors "$C_{21}$," "$C_{22}$," . . . , and "$C_{2n}$," values of inductance and capacitance may be analogically controlled. Therefore, the user turns the switch control 910 of FIG. 9 on and/or off to adjust the values of the inductance and the capacitance so as to control the consumed power of the lamp 50.

Table 1 below shows consumed power, lamp output, and light speed with respect to values of inductance selected by the inductance adjusters 210 and 310.

TABLE 1

|  | $S_1/L_1$ (7 mH) | | | | $S_2/L_2$ (9 mH) | | | |
| --- | --- | --- | --- | --- | --- | --- | --- | --- |
|  | Sample 1 | Sample 2 | Sample 3 | Average | Sample 1 | Sample 2 | Sample 3 | Average |
| Consumed Power (W) | 30.78 | 30.80 | 30.80 | 30.79 | 25.98 | 26.33 | 26.17 | 26.16 |
| Lamp Power (W) | 27.98 | 28.00 | 28.00 | 27.99 | 23.62 | 23.94 | 23.79 | 23.78 |
| Light Speed (lm) | 2451 | 2451 | 2507 | 2470 | 2137 | 2136 | 2126 | 2133 |

Here, a 28 W-high frequency (four high frequency (FHF)) lamp was used for sample 1, sample 2, and sample 3. According to the results of the experiment, when the 28 W-high frequency lamp is connected to the other end "$S_2$" of the switch of FIG. 2 or an inductance value of the second resonant inductor "$L_2$" of FIG. 3 is selected to 9 mH, the consumed power is more reduced by 4.6 W than when the 28 W-high frequency lamp is connected to the end "$S_1$" of the switch of FIG. 2 or a inductance value of the first resonant inductor "$L_1$" of FIG. 3 is selected to 7 mH. As a result, energy of about 15% is saved.

Figure 5:
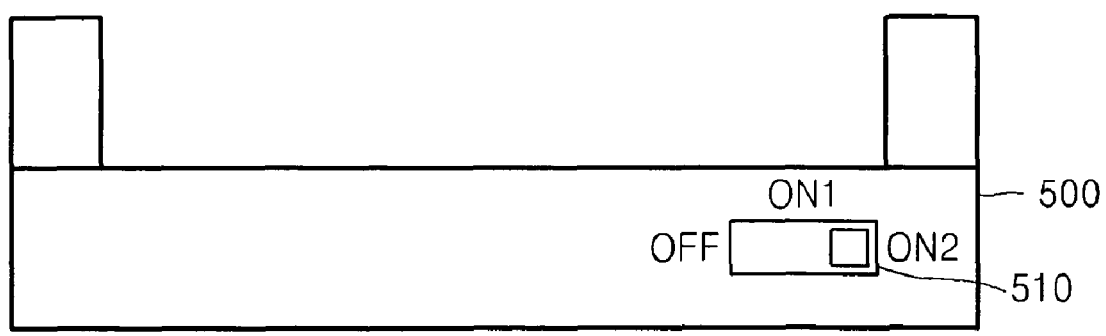
FIG. 5 is a front view of a fluorescent lamp case including a switch control according to an embodiment of the present invention.
Figure 6:
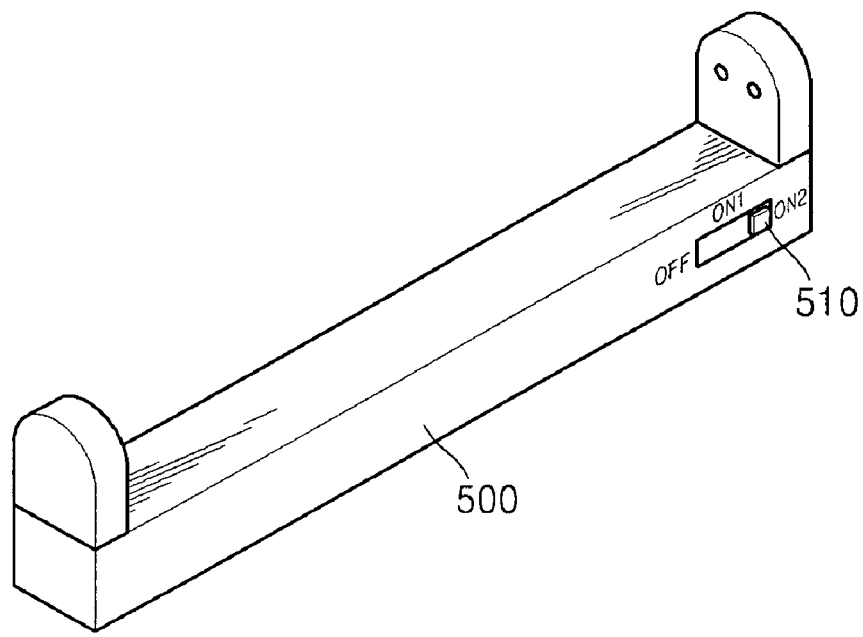
FIG. 6 is a perspective view of the fluorescent lamp case of FIG. 5.

FIGS. 5 and 6 are a front view and a perspective view of the fluorescent lamp case 500 including the switch control 510 according to an embodiment of the present invention.

The user manipulates the switch control 510 of FIG. 5 or 6 to easily adjust an inductance or capacitance value of a resonant circuit.

For example, when the switch control 510 is in the position "ON1," the end "$S_1$" of the switch "S" is selected. When the switch control 510 is in the position "ON2," the other end "$S_2$ of the switch "S" is selected. As a result, the capacitance and inductance values are adjusted. In this case, energy is saved due to a reduction in consumed power as in the results of the experiment of Table 1 above.

As described above, an electronic ballast according to the present invention can vary an inductor or a capacitor of a resonant circuit according to a selection of a user to adjust consumed power of a lamp according to the selection of the user so as to save energy. Also, the user can further easily and conveniently control the consumed power through a switch control which is positioned outside a fluorescent lamp case.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electronic ballast comprising:
a rectifier which rectifies alternating current (AC) power into direct current (DC) power;
a power factor compensator which improves a power face of the DC power;
an inverter which inverts a DC current into high frequency square wave power, the inverter comprising a first node and a second node as output nodes; and
a resonant circuit which receives the high frequency square wave power from the inverter, adjusts impedance, transforms the high frequency square wave power into high frequency sine wave power, and outputs the high frequency sine wave power, the resonant circuit comprising:
a first resonant capacitor comprising an end connected to the first node and another end connected to an inductance adjuster;
a second resonant capacitor comprising an end connected to the second node and another end connected to the inductance adjuster; and
the inductance adjuster having a structure selected from a group consisting of:
a first structure comprising:
a variable inductor which comprises an end connected to the another end of the first resonant capacitor; and
a switch which comprises an end selectively connected to one of a node and another end of the variable inductor and another end connected to the other end of the second resonant capacitor; a second structure comprising:
a first resonant inductor which comprises an end connected to the other end of the first resonant capacitor;
a second resonant inductor which comprises an end connected to another end of the first resonant capacitor; and
a switch which comprises an end selectively connected to one of the other end of the first resonant inductor and another end of the second resonant inductor and another end connected to the other end of the second resonant capacitor; and a third structure comprising:
first through $n^{th}$ resonant inductors comprising ends respectively connected to the other end of the first resonant capacitor in parallel; and
a switch comprising ends selectively connected to other ends of the first through $n^{th}$ resonant inductors and another end connected to the other end of the second resonant capacitor.

2. The electronic ballast of claim 1, wherein the inductance adjuster has the first structure.

3. The electronic ballast of claim 1, wherein the inductance adjuster has the second structure.

4. The electronic ballast of claim 1, wherein the inductance adjuster has the third structure.

5. An electronic ballast, comprising:
   a rectifier which rectifies alternating current (AC) power into direct current (DC) power;
   a power factor compensator which improves a power face of the DC power;
   an inverter which inverts a DC current into high frequency square wave power, the inverter comprising a first node and a second node as output nodes; and
   a resonant circuit which receives the high frequency square wave power from the inverter, adjusts impedance, transforms the high frequency square wave power into high frequency sine wave power, and outputs the high frequency sine wave power, the resonant circuit comprising a first resonant capacitor and an inductor which are sequentially connected to the first node and a capacitance adjuster which is connected between the inductor and the second node and connected in parallel with a lamp;
   wherein the capacitance adjuster comprises:
   a second resonant capacitor which comprises an end connected to the second node;
   a third resonant capacitor which comprises an end connected to the second node; and
   a switch which comprises an end selectively connected to one of another end of the second resonant capacitor and another end of the third resonant capacitor, and another end connected to the inductor.

6. The electronic ballast of claim 5, wherein the capacitance adjuster comprises:
   second through $n^{th}$ resonant capacitors which comprise ends respectively connected to the second node in parallel; and
   a switch which comprises ends selectively connected to other ends of the second through $n^{th}$ n resonant capacitors and another end connected to the inductor.

7. The electronic ballast of claim 2, wherein the switch is connected to and controlled by a switch control which is positioned outside a fluorescent lamp case.

* * * * *